United States Patent [19]
Matibe

[11] Patent Number: 5,826,366
[45] Date of Patent: Oct. 27, 1998

[54] ILLUMINATED FISHING ROD

[76] Inventor: Jeffrey T. Matibe, 512 Westchester Dr., North Huntington, Pa. 15642

[21] Appl. No.: 786,370

[22] Filed: Jan. 16, 1997

[51] Int. Cl.⁶ .................................................. A01K 87/00
[52] U.S. Cl. ............................................................ 43/17.5
[58] Field of Search ................................... 43/17.5, 18.1, 43/18.5; 362/109

[56] References Cited

U.S. PATENT DOCUMENTS

| | | | |
|---|---|---|---|
| 2,646,641 | 7/1953 | George | 43/17.5 |
| 2,805,508 | 9/1957 | Oldfield | 43/17.5 |
| 3,017,499 | 1/1962 | Fore | 43/17.5 |
| 3,798,822 | 3/1974 | Lampus | 43/17.5 |
| 3,862,509 | 1/1975 | Petersen | 43/17.5 |
| 4,026,059 | 5/1977 | Ochs | 43/17.5 |
| 4,085,437 | 4/1978 | Hrdlicka | 43/17.5 |
| 4,117,618 | 10/1978 | Utsler | 43/17.5 |
| 4,617,751 | 10/1986 | Johansson | 43/17.5 |
| 4,697,375 | 10/1987 | Mills | 43/17.5 |
| 4,750,287 | 6/1988 | Myers | 43/17.5 |
| 4,775,920 | 10/1988 | Seibert | 43/17.5 |
| 5,083,247 | 1/1992 | Robinson | 43/17.5 |
| 5,172,508 | 12/1992 | Schmidt | 43/17.5 |
| 5,182,873 | 2/1993 | Aragon | 43/17.5 |
| 5,276,990 | 1/1994 | Ramirez | 43/17.5 |
| 5,347,741 | 9/1994 | Konrad | 43/17.5 |
| 5,357,410 | 10/1994 | Cota | 43/17.5 |
| 5,566,493 | 10/1996 | Minoric | 43/17.5 |
| 5,586,403 | 12/1996 | Ward | 43/17.5 |
| 5,644,864 | 7/1997 | Kelly | 43/17.5 |

*Primary Examiner*—Kurt Rowan

[57] ABSTRACT

A rod for supporting fishing line and providing illumination during a fishing procedure. The inventive device includes a handle having a fishing reel secured thereto. A flexible transparent tube extends from the handle and includes a plurality of line guides projecting therefrom which guide a fishing line from the reel. The flexible transparent tube includes an excitable medium which can be energized to dispense light radially outwardly along a longitudinal length of the transparent tube.

2 Claims, 5 Drawing Sheets

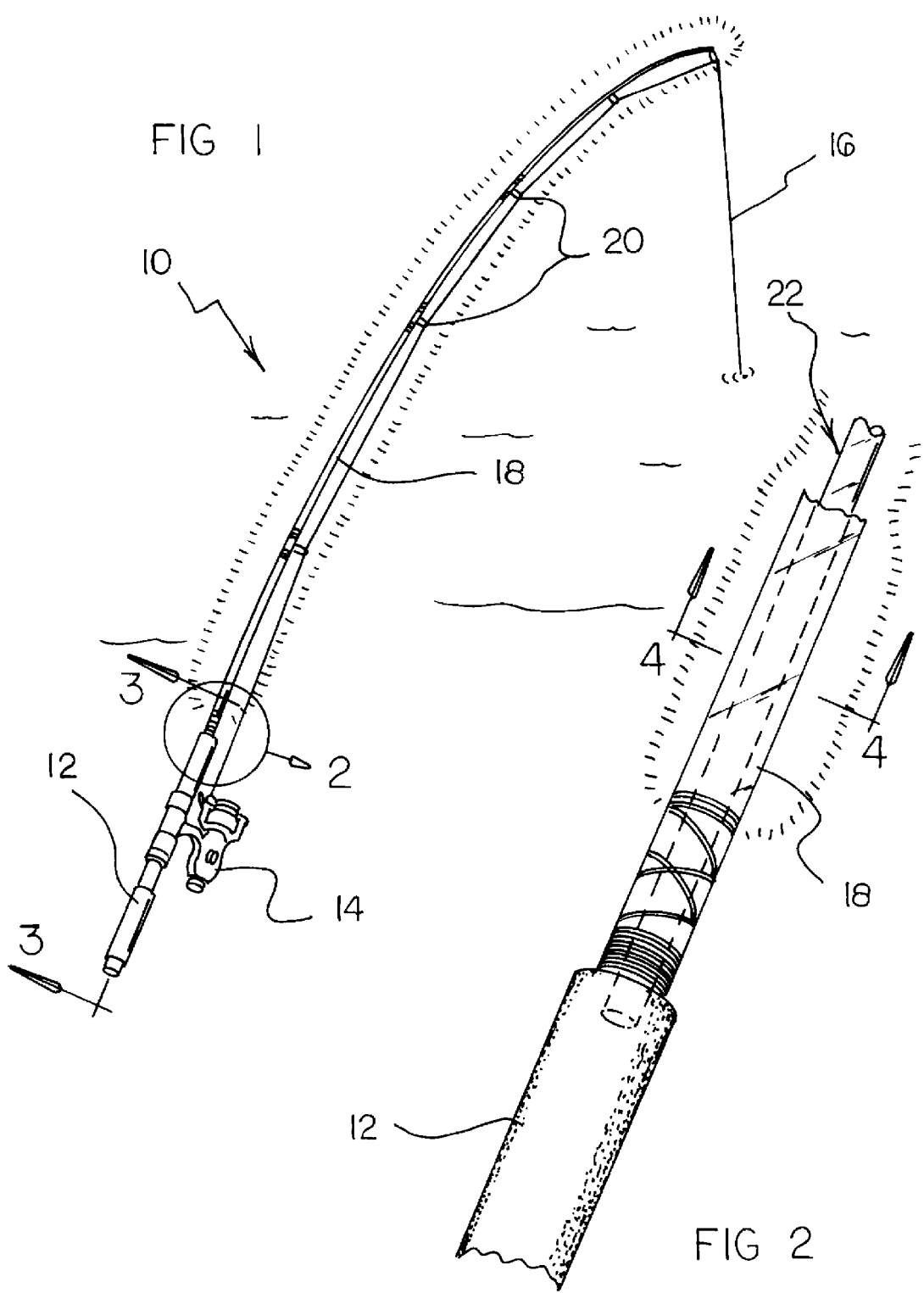

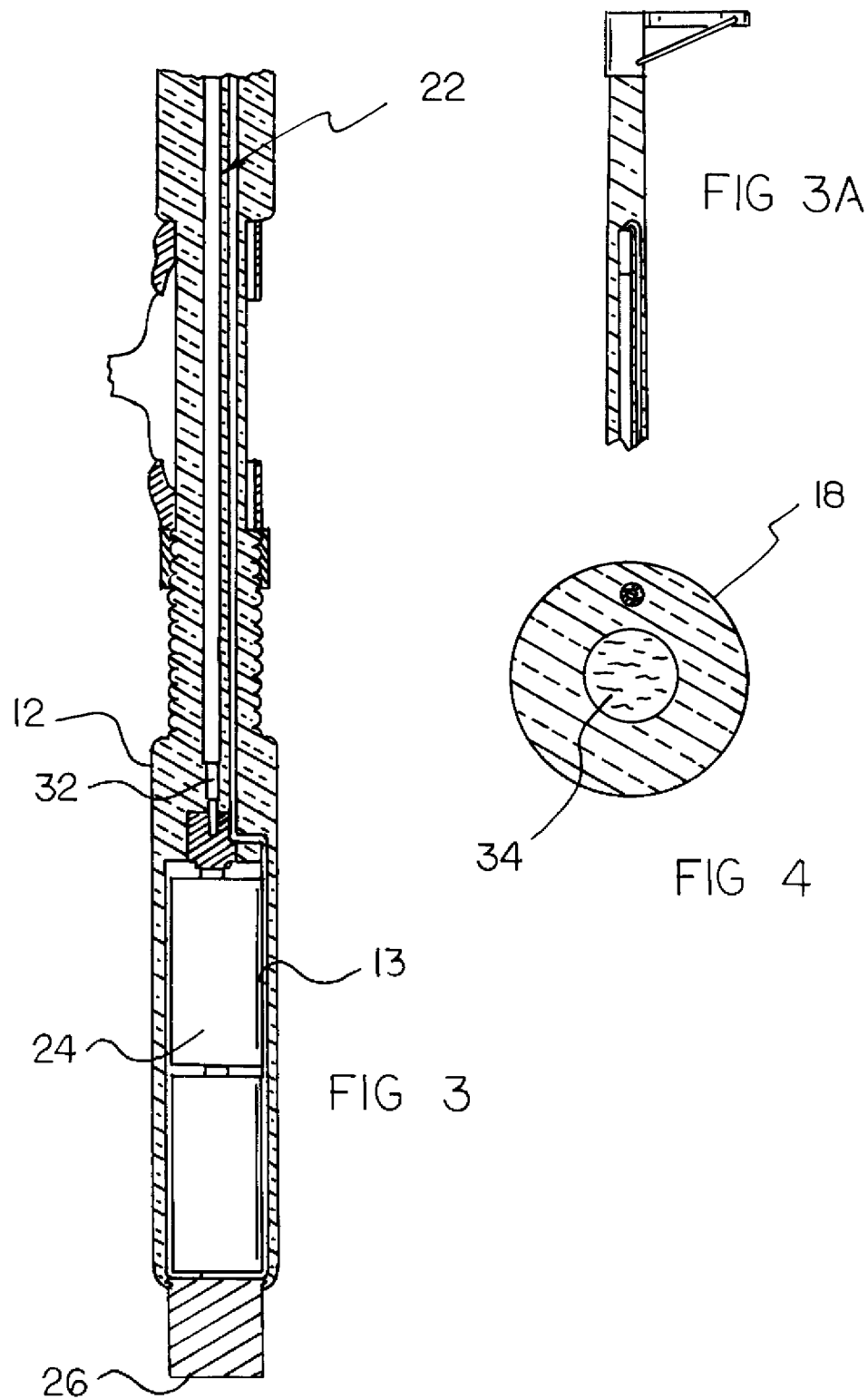

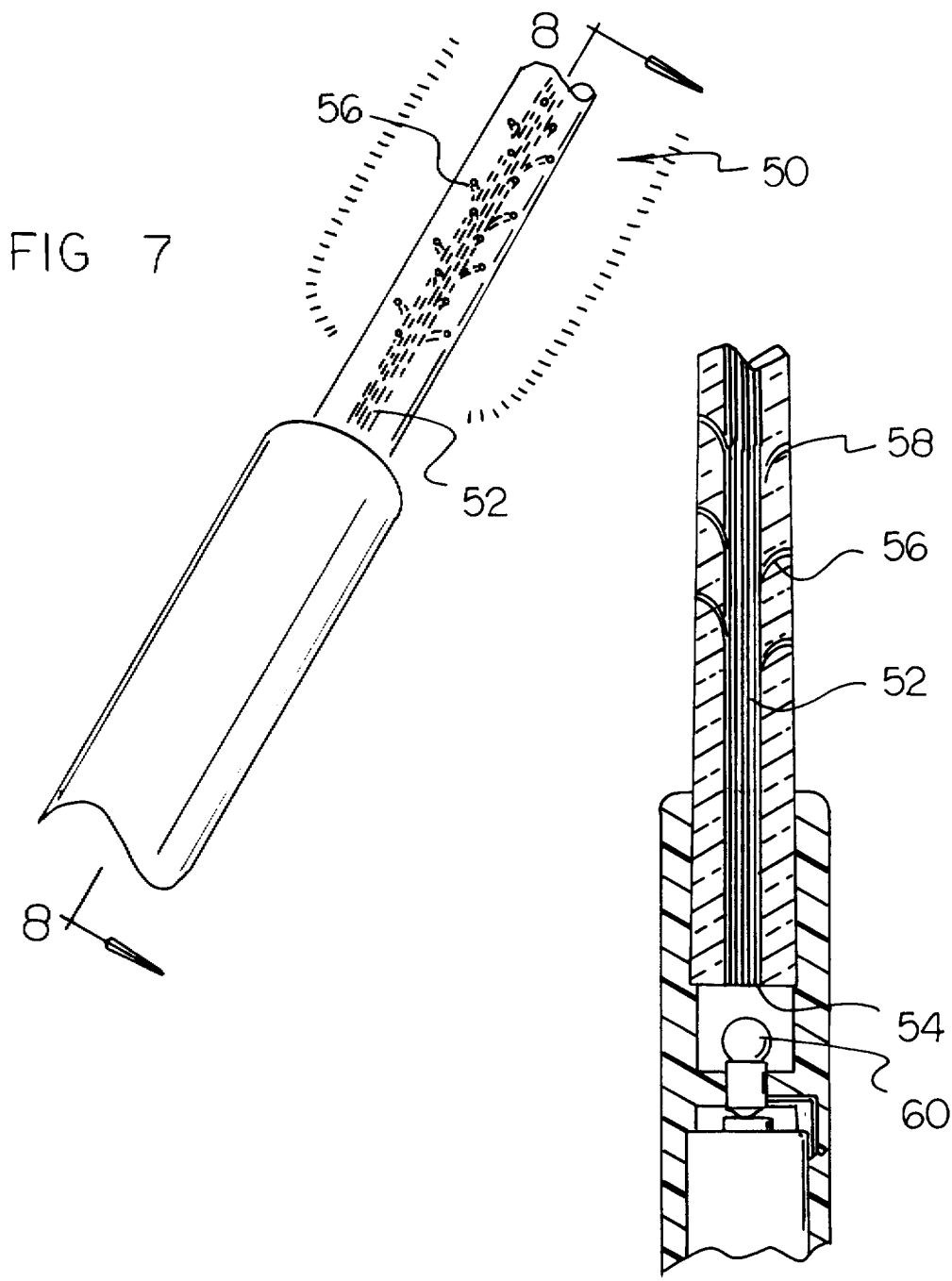

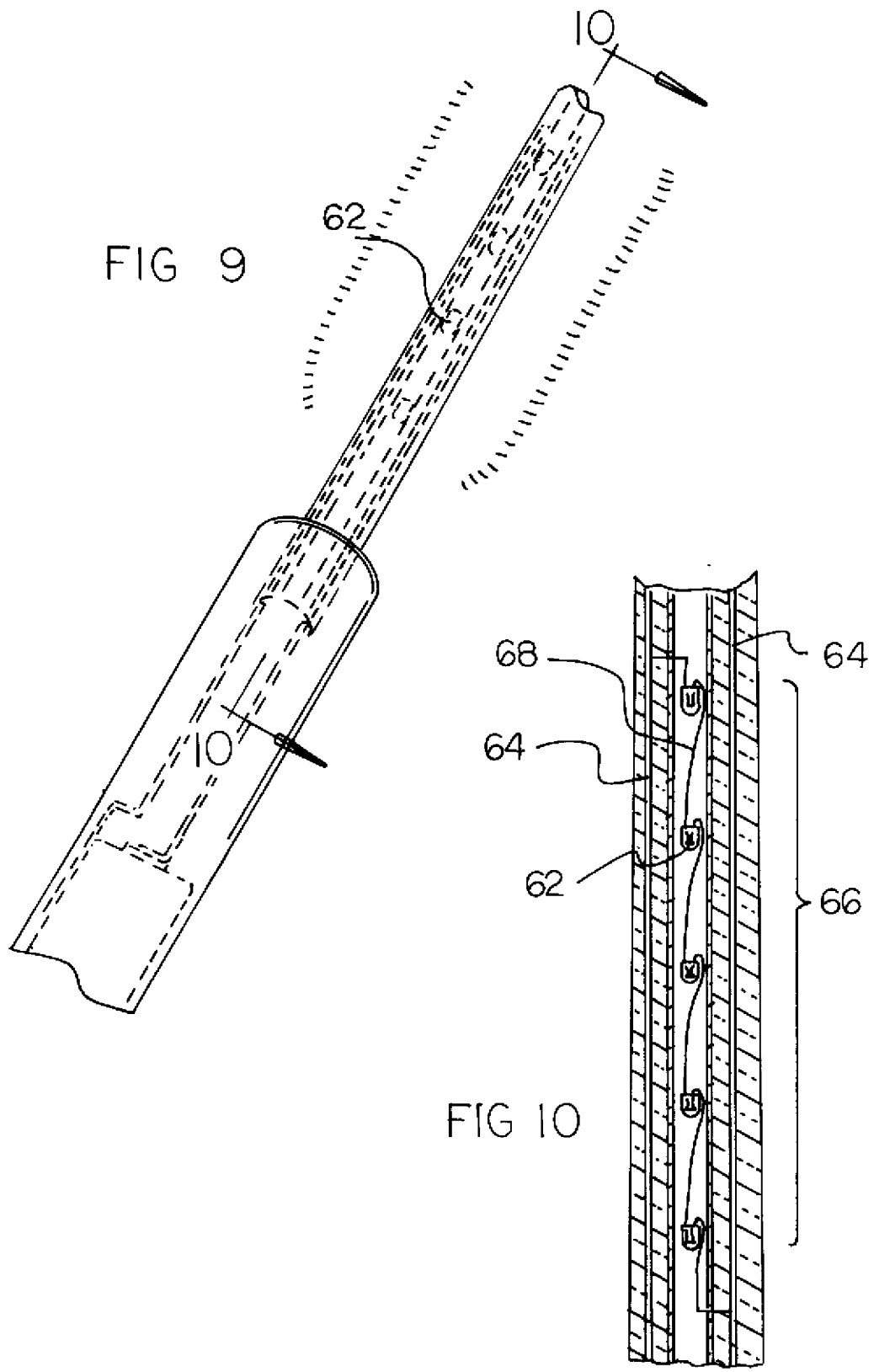

ILLUMINATED FISHING ROD

BACKGROUND OF THE INVENTION

1. Field of the Invention

The present invention relates to fishing rod structures and more particularly pertains to an illuminated fishing rod for supporting fishing line and providing illumination during a fishing procedure.

2. Description of the Prior Art

The use of fishing rod structures is known in the prior art. More specifically, fishing rod structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing rod structures include U.S. Pat. No. 5,347,741; U.S. Pat. No. 5,276,990; U.S. Pat. No. 4,775,920; U.S. Pat. No. 4,085,437; Design U.S. Pat. No. 349,748; and Design U.S. Pat. No. 305,450.

In this respect, the illuminated fishing rod according to the present invention substantially departs from the conventional concepts and designs of the prior art, and in so doing provides an apparatus primarily developed for the purpose of for supporting fishing line and providing illumination during a fishing procedure.

Therefore, it can be appreciated that there exists a continuing need for a new and improved illuminated fishing rod which can be used for supporting fishing line and providing illumination during a fishing procedure. In this regard, the present invention substantially fulfills this need.

SUMMARY OF THE INVENTION

In view of the foregoing disadvantages inherent in the known types of illuminated fishing rods now present in the prior art, the present invention provides an improved illuminated fishing rod. As such, the general purpose of the present invention, which will be described subsequently in greater detail, is to provide a new and improved illuminated fishing rod which has all the advantages of the prior art and none of the disadvantages.

To attain this, the present invention generally comprises a rod for supporting fishing line and providing illumination during a fishing procedure. The inventive device includes a handle having a fishing reel secured thereto. A flexible transparent tube extends from the handle and includes a plurality of line guides projecting therefrom which guide a fishing line from the reel. The flexible transparent tube includes an excitable medium which can be energized to dispense light radially outwardly along a longitudinal length of the transparent tube.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved illuminated fishing rod which has all the advantages of the prior art illuminated fishing rods and none of the disadvantages.

It is another object of the present invention to provide a new and improved illuminated fishing rod which may be easily and efficiently manufactured and marketed.

It is a further object of the present invention to provide a new and improved illuminated fishing rod which is of a durable and reliable construction.

An even further object of the present invention is to provide a new and improved illuminated fishing rod which is susceptible of a low cost of manufacture with regard to both materials and labor, and which accordingly is then susceptible of low prices of sale to the consuming public, thereby making such illuminated fishing rod economically available to the buying public.

Still yet another object of the present invention is to provide a new and improved illuminated fishing rod which provides in the apparatuses and methods of the prior art some of the advantages thereof, while simultaneously overcoming some of the disadvantages normally associated therewith.

Still another object of the present invention is to support fishing line and providing illumination during a fishing procedure.

Lastly, it is an object of the present invention to provide a new and improved rod for supporting fishing line and providing illumination during a fishing procedure. The inventive device includes a handle having a fishing reel secured thereto. A flexible transparent tube extends from the handle and includes a plurality of line guides projecting therefrom which guide a fishing line from the reel. The flexible transparent tube includes an excitable medium which can be energized to dispense light radially outwardly along a longitudinal length of the transparent tube.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of an illuminated fishing rod according to the present invention in use.

FIG. 2 is an isometric illustration of the area set forth in FIG. 1.

FIG. 3 and 3A is a cross sectional view taken along line 3—3 of FIG. 1.

FIG. 4 is a cross sectional view taken along 4—4 of FIG. 2.

FIG. 7 is a perspective view of an alternate embodiment of the present invention, wherein the rod is illuminated via a plurality of fiber optic strands.

FIG. 8 is a cross-sectional view of the alternate embodiment of the present invention as shown in FIG. 7.

FIG. 9 is a perspective view of yet another alternate embodiment of the present invention, wherein the rod is illuminated via a plurality of lamps.

FIG. 10 is a cross-section of the second alternate embodiment taken along line 10—10 shown in FIG. 9.

DESCRIPTION OF THE PREFERRED EMBODIMENT

Figure 5:
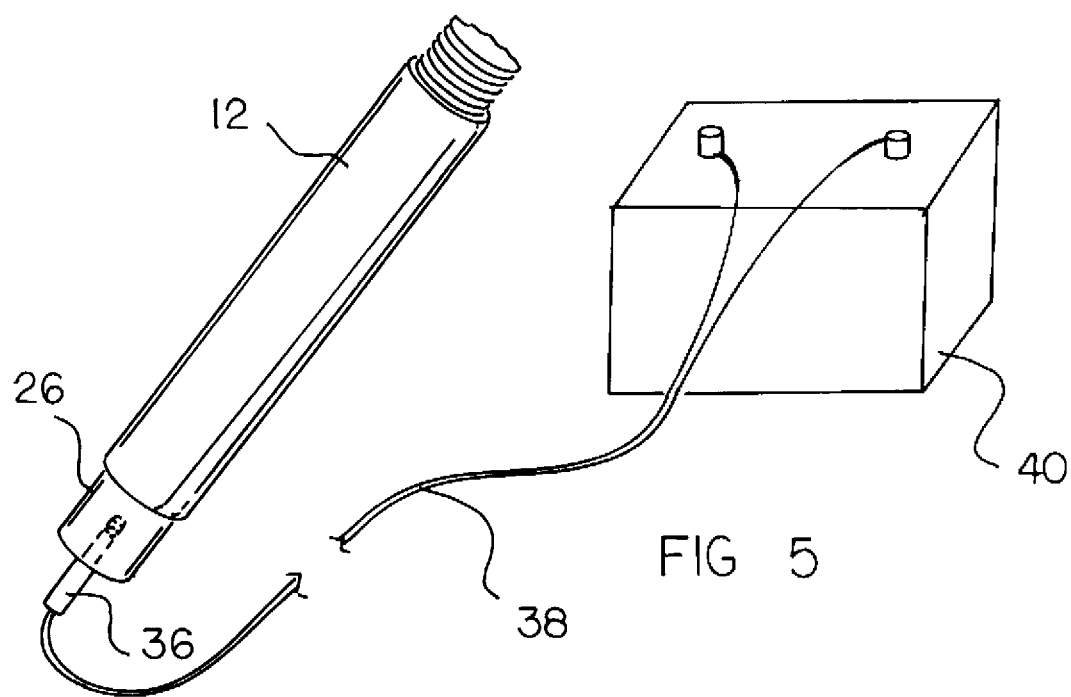
FIG. 5 is an isometric illustration of a portion of the present invention coupled to an external battery.

With reference now to the drawings, and in particular to FIGS. 1–10 thereof, a new illuminated fishing rod embodying the principles and concepts of the present invention and generally designated by the reference numeral 10 will be described.

More specifically, it will be noted that the illuminated fishing rod 10 comprises a handle 12 having a fishing reel 14 coupled thereto for storing and supplying fishing line 16 in a conventionally known manner. A flexible transparent tube 18 projects collinearly from the handle 12 and includes a plurality of line guides 20 coupled thereto which guide the fishing line 16 from the reel 14 along a longitudinal length of the flexible transparent tube 18 for subsequent projection therefrom at an outer distal end or tip of the flexible transparent tube. The flexible transparent tube may be constructed from any one of various materials which are flexible, transparent, and impermeable, such as graphite and fiber glass. As an option, a thin layer of flexible transparent plastic may line the flexible transparent tube 18 to ensure impermeability. An illumination means 22 extends through the flexible transparent tube 18 and can be energized so as to dispense illumination radially outwardly from the flexible transparent tube 18 along a longitudinal length thereof substantially as shown in FIG. 1 of the drawings. By this structure, an individual is afforded illumination during a fishing procedure.

Referring now to FIGS. 2 through 4 wherein the present invention 10 is illustrated in detail, it can be shown that the handle 12 is shaped so as to define an battery cavity 13 extending longitudinally thereinto within which one or more batteries 24 can be positioned for effecting energization of the illumination means 22. As shown in FIG. 3, an end cap 26 is removably coupled by threads or the like to a lower end of the handle 12 so as to permit selective access to the batteries 24 contained therein. The end cap 26 preferably includes an electrical contact positionable into to electrical communication with one of the batteries 24.

With continuing reference to FIGS. 3 and 4, it can shown that the flexible transparent tube 18 of the present invention 10 preferably comprises electrodes 32 projecting through insulation sheaths and into respectively opposed ends of the flexible transparent tube. The electrodes 32 at the opposed ends of the flexible transparent tube 18 are positioned into electrical communication with the batteries 24 within the handle 12 by unillustrated switching means conventionally known. The flexible transparent tube has a cavity 31. As shown in FIG. 4, the illumination-means comprises a free excitable medium 34 contained within the cavity of the flexible transparent tube 18 and positioned in electrical communication with the electrodes 32 projecting thereinto. The excitable medium 34 may comprise a neon gas or other conventionally known medium which radiates visible illumination when excited by an electrical charge. By this structure, the electrodes 32 can be positioned into electrical communication with the batteries 24 so as to energize the excitable medium 34 to cause a subsequent generation and dispensing of visible light through the flexible transparent tube 18.

Figure 6:
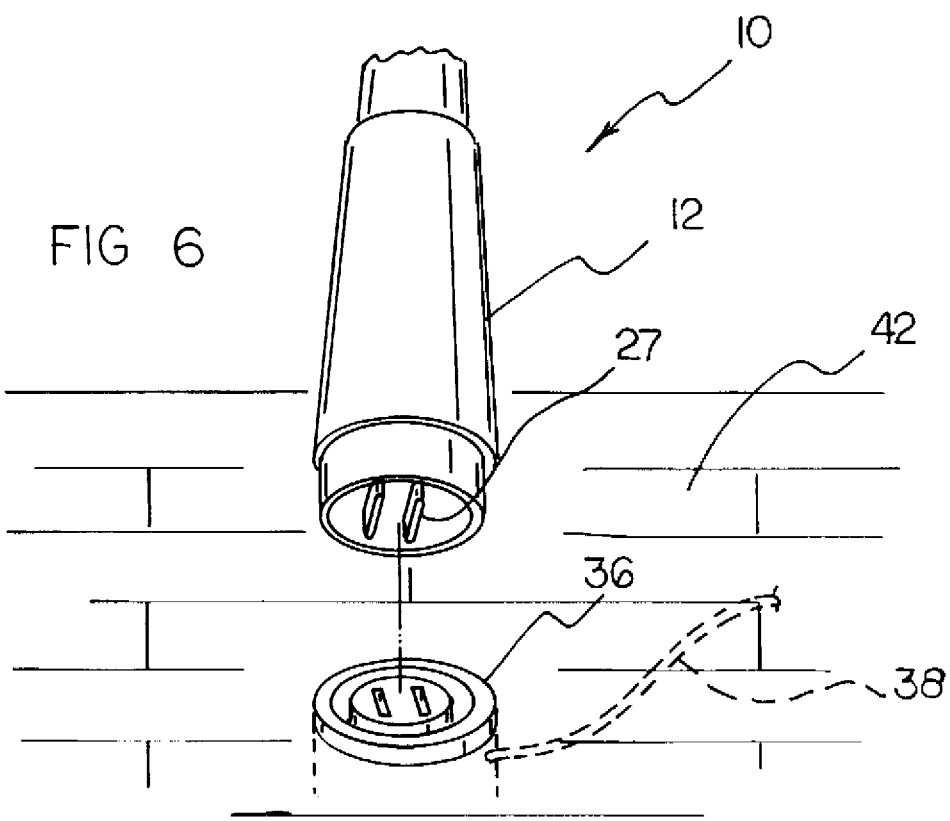
FIG. 6 is an exploded isometric illustration of the invention including an electrical connector mounted to a support structure.

Referring now to FIG. 5, it can be shown that the end cap 26 may include an electrical receiver 27 mounted therewithin and positioned in electrical communication with the batteries 24 of the handle 12. The present invention 10 may thus further comprise an electrical connector 36 removably coupled to the electrical receiver within the end cap 26 and positioned in electrical communication with a coupling cable 38 which can be coupled to an external battery 40. If desired, and as shown in FIG. 6, the electrical connector 36 can be mounted to a support structure 42 such as a dock or pier, whereby the handle 12 of the device 10 is supported in a substantially orthogonal orientation relative to the support structure 42 so as to secure the fishing rod 10 relative to the support structure 42.

In use, the illuminated fishing rod 10 of the present invention can be easily utilized for supporting a fishing line and providing illumination during a fishing procedure. The flexible construction of the transparent tube 18 permits the device 10 to flex as the fishing line 16 is tensioned substantially as shown in FIG. 1 of the drawings. The batteries 24 contained within the handle 12 can be selectively replaced through a removal of the end cap 26, or alternatively the device 10 may be coupled to an external battery 40 as shown in FIGS. 5 and 6 of the drawings.

In a first alternate embodiment 50, as shown in FIGS. 7 & 8, the abovementioned illumination means includes a multiplicity of fiber optic strands 52 in lieu of the neon gas. Each fiber optic strand is situated within the flexible transparent tube with a first end 54 thereof positioned adjacent a base thereof. Each fiber optic strand further has a second end 56 bent at a 90 degree angle. To ensure that the bend in the second end is maintained, the flexible transparent tube is equipped with small bores 58 in which the second end of the fiber optic strands are secured. See FIG. 8. It should be noted that an entire surface of the flexible transparent tube is covered with such bores. In the present invention, the handle further includes a lamp 60 situated adjacent the base of the flexible transparent tube in communication with the power source. As such, the lamp is adapted to emit light through the fiber optic strands thereby allowing the emission of high intensity speckles of light radially outward from a periphery of the flexible transparent tube. It should be noted that the intensity of light emitted from the second ends of the strands is greater than that of the remaining surface of the fiber optic strands.

In a second alternate embodiment, as shown in FIGS. 9 & 10, the abovementioned illumination means includes a plurality of small spaced lamps 62 in lieu of the neon gas. The plurality of space lamps are situated within the flexible transparent tube along an entire length thereof. As specifically shown in FIG. 10, the flexible transparent tube further includes a pair of wires 64 extending along the length thereof with each wire connected to the power source for providing power to the lamps. Preferably, the lamps are divided up into a plurality of banks 66 wherein the lamps of each bank are connected in series. Note that a single bank is shown in FIG. 10. Each bank is then in turn connected in parallel with other banks between the pair of wires. To prevent the contacts of the lamps from shorting, each lamp preferably is connected to an adjacent lamp with a J-shaped connector 68. It should be noted that the utilization of banks of a predetermined amount of lamps is critical for providing a necessary voltage to the lamps.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illuminated fishing rod comprising:
    a handle having a fishing reel coupled thereto for storing and supplying fishing line, the handle being shaped so as to define a battery cavity extending longitudinally thereinto within which as least one battery can be positioned therein;
    a flexible transparent tube projecting collinearly from the handle and including a plurality of line guides coupled thereto, the flexible transparent tube having a cavity with electrodes positioned therein, the electrodes being positionable into electrical communication with the battery;
    a free neon gas contained within said cavity of the flexible transparent tube and positioned in electrical communication with the electrodes, whereby energization of the neon gas through the electrodes will result in a generation and transmission of visible light through the flexible transparent tube; and
    an end cap removably coupled to a lower end of the handle.

2. An illuminated fishing rod comprising:
    a handle having a fishing reel coupled thereto for storing and supplying fishing line;
    a flexible transparent tube projecting collinearly from the handle and including a plurality of line guides coupled thereto, the flexible transparent tube having a cavity with electrodes positioned therein;
    a free neon gas contained within said cavity of the flexible transparent tube and positioned in electrical communication with the electrodes, whereby energization of the neon gas through the electrodes will result in a generation and transmission of visible light through the flexible transparent tube;
    an end cap removably coupled to a lower end of the handle, the end cap including an electrical receiver mounted thereon and in communication with the electrodes;
    an electrical connector and a coupling cable being positionable into electrical communication with an external power source, the electrical connector being mountable to a support structure whereby the electrical connector is removably coupled to the electrical receiver.

* * * * *